Figure 1:
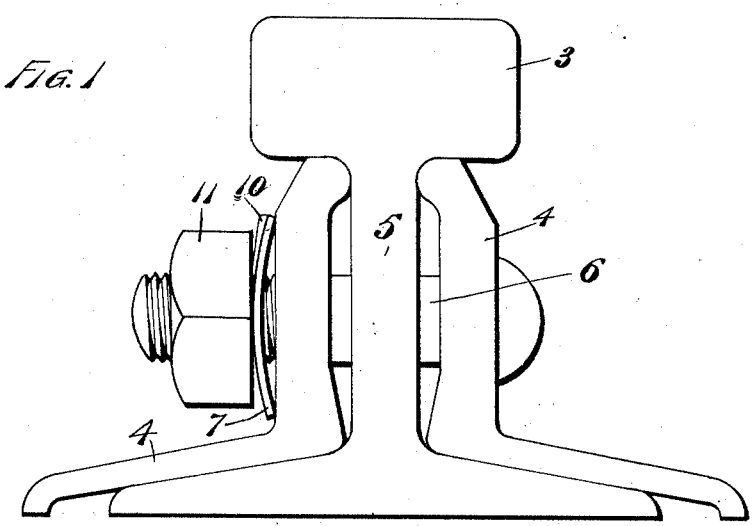

E. E. ELLMANN, F. A. KELL AND L. L. ZACHARIAS.
WASHER.
APPLICATION FILED MAY 5, 1920.

1,373,061.

Patented Mar. 29, 1921.

INVENTORS
ERNEST E. ELLMANN
FRANK A. KELL
LEONARD L. ZACHARIAS
By Edward E. Longan
ATTY.

UNITED STATES PATENT OFFICE.

ERNEST E. ELLMANN, FRANK A. KELL, AND LEONARD L. ZACHARIAS, OF ST. LOUIS, MISSOURI; SAID KELL AND ZACHARIAS ASSIGNORS TO SAID ELLMANN.

WASHER.

1,373,061.      Specification of Letters Patent.      Patented Mar. 29, 1921.

Original application filed November 13, 1919, Serial No. 337,700. Divided and this application filed May 5, 1920. Serial No. 379,020.

*To all whom it may concern:*

Be it known that we, ERNEST E. ELLMANN, FRANK A. KELL, and LEONARD L. ZACHARIAS, citizens of the United States, and residents of the city of St. Louis and State of Missouri, have invented certain new and useful Improvements in Washers, of which the following is a specification containing a full, clear, and exact description, references being had to the accompanying drawings, forming a part thereof.

Our invention relates to improvements in washers, and has for its primary object the construction of a washer for locking nuts, and is of such shape that it will not turn when applied to the work, and so devised that it takes up or compensates for the stretching of the bolt on which it is used.

The washer is specially constructed for railway track construction, rigid, etc.

Figure 2:
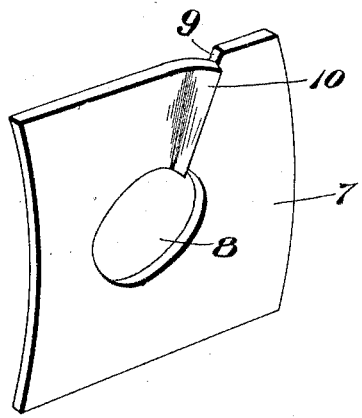

In the drawings:

Figure 1 is an end view of a railroad rail having fish plates on each side with a bolt extending therethrough and our improved washer shown in position; and Fig. 2 is a perspective view of our improved washer.

This application is a division of our application filed November 13, 1919, Serial No. 337,700, and allowed March 31, 1920.

Referring to the drawings:

3 indicates a railroad rail and 4 the fish plates which are of the ordinary construction. Through the fish plates and the web 5 of the rail the bolt 6, of ordinary construction, is passed. Over the threaded end of the bolt 6 we place our improved washer 7, as illustrated in Fig. 2. This washer is formed of spring steel and through its vertical section, when in use, is concavo-convex, and is provided with the usual bolt opening 8. 9 indicates a slit which is formed in the washer and extends from the bolt opening 8 entirely through the material surrounding the opening. 10 indicates an up-turned edge formed in the washer adjacent the slit 9. This up-turned edge answers as a holder or stop against the side of the nut 11 when said nut has been applied. It will be observed that this shoulder or edge 10 is inclined and is resilient so that the nut may freely pass thereover when being applied and tightened. As previously pointed out, the washer is concavo-convex and is resilient for the purpose of taking up or compensating for the stretching or elongating of the bolt 6.

It will further be observed that the angular formation of the washer when its lower edge is resting against the fish plate, will prevent the washer from turning. If desired, the concavo-convexity of the washer may be eliminated and the washer formed flat, in which instance it is desirable to provide the washer probably with a wider shoulder or up-turned edge 10.

It will be observed that the nut 11 being softer than the spring steel washer 7 that the bent up portion 10 will engage the inside face of the washer and dig into the same and answer as a stop to prevent the washer from turning or loosening.

Having fully described our invention, what we claim is:

A washer stamped from a single piece of material and being concavo-convex in cross section and provided with the usual bolt opening and an angular edge so as to prevent the said washer from turning, a slit radially arranged with relation to the bolt opening and extending entirely from the inner edge of said opening to the edge of the washer, and an up-turned resilient and relatively sharp edge formed integral with the washer and opposite to the slit and having its edge arranged radially with respect to the inner edge of the bolt opening.

In testimony whereof we have signed our names to this specification.

ERNEST E. ELLMANN.
FRANK A. KELL.
LEONARD L. ZACHARIAS.